United States Patent
Kojima

(10) Patent No.: US 12,528,844 B2
(45) Date of Patent: *Jan. 20, 2026

(54) MODIFIED CYANOBACTERIUM, MODIFIED CYANOBACTERIUM PRODUCTION METHOD, AND PROTEIN PRODUCTION METHOD

(71) Applicant: Panasonic Intellectual Property Management Co., Ltd., Osaka (JP)

(72) Inventor: Seiji Kojima, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 873 days.

This patent is subject to a terminal disclaimer.

(21) Appl. No.: 17/747,607

(22) Filed: May 18, 2022

(65) Prior Publication Data

US 2022/0275033 A1    Sep. 1, 2022

Related U.S. Application Data

(63) Continuation of application No. PCT/JP2020/042551, filed on Nov. 16, 2020.

(30) Foreign Application Priority Data

Nov. 21, 2019   (JP) ................... 2019-210111

(51) Int. Cl.
- C07K 14/415 (2006.01)
- C07K 14/195 (2006.01)
- C12P 21/02 (2006.01)

(52) U.S. Cl.
CPC .......... C07K 14/415 (2013.01); C07K 14/195 (2013.01); C12P 21/02 (2013.01)

(58) Field of Classification Search
CPC .................................................. C07K 14/415
See application file for complete search history.

(56) References Cited

U.S. PATENT DOCUMENTS

| | | | |
|---|---|---|---|
| 2015/0093495 A1* | 4/2015 | Shen | C12P 21/00 435/68.1 |
| 2017/0159084 A1 | 6/2017 | Kawahara et al. | |
| 2019/0048381 A1 | 2/2019 | McNamara et al. | |
| 2019/0218531 A1 | 7/2019 | Ducat et al. | |

FOREIGN PATENT DOCUMENTS

| | | |
|---|---|---|
| JP | 7-203949 | 8/1995 |
| JP | 2015-109828 | 6/2015 |
| JP | 6341676 | 6/2018 |

OTHER PUBLICATIONS

Office Action issued Nov. 3, 2023 in corresponding Chinese Patent Application No. 202080080619.1, with English language translation of the Search Report.
Oliveira, P. et al., "The versatile TolC-like Slr1270 in the cyanobacterium *Synechocystis* sp. PCC 6803", Environmental Microbiology, vol. 18, No. 2, pp. 486-502, 2016.
International Search Report (ISR) issued on Jan. 26, 2021 in International (PCT) Application No. PCT/JP2020/042551.
Dexter, J., et al., "Metabolic engineering of cyanobacteria for ethanol production", Energy & Environmental Science, 2009, vol. 2, pp. 857-864.
Atsumi, A., et al., "Direct photosynthetic recycling of carbon dioxide to isobutyraldehyde", Nature Biotechnology, 2009, vol. 27, pp. 1177-1180.
Zhou, J., et al., "Discovery of a super-strong promoter enables efficient production of heterologous proteins in cyanobacteria", Scientific Reports, 2014, vol. 4, Article No. 4500, pp. 1-6.
Ng, A.H., et al., "Fine-Tuning of Photoautotrophic Protein Production by Combining Promoters and Neutral Sites in the Cyanobacterium *Synechocystis* sp. Strain PCC 6803", Applied and Environmental Microbiology, 2015, vol. 81, No. 19, pp. 6857-6863.
Nikaido, H., "Molecular Basis of Bacterial Outer Membrane Permeability Revisited", Microbiology and Molecular Biology Reviews, 2003, vol. 67, No. 4, pp. 593-656.
Kowata, H., et al., "Outer Membrane Permeability of Cyanobacterium *Synechocystis* sp. Strain PCC 6803: Studies of Passive Diffusion of Small Organic Nutrients Reveal the Absence of Classical Porins and Intrinsically Low Permeability", Journal of Bacteriology, 2017, vol. 199, Issue 19, e00371-17, pp. 1-11.
Ponce-Toledo, R.I., et al., "An Early-Branching Freshwater Cyanobacterium at the Origin of Plastids", Current Biology, 2017, vol. 27, pp. 386-391.
Kojima, S. et al., "Outer Membrane Proteins Derived from Non-cyanobacterial Lineage Cover the Peptidoglycan of *Cyanophora paradoxa* Cyanelles and Serve as a Cyanelle Diffusion Channel", Journal of Biological Chemistry, Sep. 2016, vol. 291, No. 38, pp. 20198-20209.
Yao, L., et al., "Multiple Gene Repression in Cyanobacteria Using CRISPRi", ACS Synthetic Biology, 2016, vol. 5, pp. 207-212.
Jiménez-Gómez, A., et al., "Probiotic activities of *Rhizobium laguerreae* on growth and quality of spinach", Scientific Reports, 2018, vol. 8, Article No. 295, pp. 1-10.
çakmakçi, R. et al., "The influence of plant growth-promoting rhizobacteria on growth and enzyme activities in wheat and spinach plants", Journal of Plant Nutrition and Soil Science, 2007, vol. 170, pp. 288-295.

* cited by examiner

*Primary Examiner* — Suzanne M Noakes
(74) *Attorney, Agent, or Firm* — Wenderoth, Lind & Ponack, L.L.P.

(57)    ABSTRACT

A modified cyanobacterium in which an organic channel protein which improves protein permeability of an outer wall is expressed.

4 Claims, 1 Drawing Sheet

Specification includes a Sequence Listing.

MODIFIED CYANOBACTERIUM, MODIFIED CYANOBACTERIUM PRODUCTION METHOD, AND PROTEIN PRODUCTION METHOD

CROSS REFERENCE TO RELATED APPLICATIONS

This is a continuation application of PCT International Application No. PCT/JP2020/042551 filed on Nov. 16, 2020, designating the United States of America, which is based on and claims priority of Japanese Patent Application No. 2019-210111 filed on Nov. 21, 2019. The entire disclosures of the above-identified applications, including the specifications, drawings and claims are incorporated herein by reference in their entirety.

FIELD

The present disclosure relates to a modified cyanobacterium having improved secretory productivity of protein that is produced within the bacterial cell and secreted to the outside of the bacterial cell, a modified cyanobacterium production method, and a protein production method.

BACKGROUND

Bio-manufacturing schemes that do not depend on fossil fuel and have low environmental load have been desired for a wide range of industrial fields from chemical industry to agricultural, fishery, and livestock industry. Bio-manufacturing using microbes has received attention as production systems that satisfy the requirements described above, because it can be performed in an environment of ambient pressure and temperature and has become able to produce a wide range of compounds by recent development of genetic manipulation technology. Among others, photosynthetic microbes such as cyanobacterium and algae can utilize carbon dioxide ($CO_2$) in air as a carbon source with light as an energy source and are therefore particularly expected as carbon-neutral next-generation bio-manufacturing systems.

For example, ethanol (Non Patent Literature (NPL) 1), isobutanol (NPL 2), alkanes (Patent Literature (PTL) 1), fatty acid (PTL 2), and protein (NPL 3) have been reported as materials that are produced using cyanobacterium.

For example, NPL 4 discloses an approach for allowing cyanobacterium to express protein.

CITATION LIST

Patent Literature

PTL 1: Japanese Unexamined Patent Application Publication No. 2015-109828
PTL 2: Japanese Patent No. 6341676

Non Patent Literature

NPL 1: Jason Dexter and Pengcheng Fu, "Metabolic engineering of cyanobacteria for ethanol production", Energy & Environmental Science, Royal Society of Chemistry, 2009, Vol. 2, pp. 857-864
NPL 2: Shota Atsumi et al., "Direct photosynthetic recycling of carbon dioxide to isobutyraldehyde", Nature Biotechnology, Nature Publishing Group, 2009, Vol. 27, pp. 1177-1180
NPL 3: Jie Zhou et al., "Discovery of a super-strong promoter enable efficient production of heterologous proteins in cyanobacteria", Scientific Reports, Nature Research, 2014, Vol. 4, Article No. 4500
NPL 4: Andrew H. Ng et al., "Fine-Tuning of Photoautotrophic *Synechocystis* sp. Strain PCC 6803", Applied and Environmental Microbiology, American Society for Microbiology, 2015, Vol. 81, pp. 6857-6863

SUMMARY

Technical Problem

However, in the aforementioned conventional techniques, it is difficult to produce protein efficiently using cyanobacteria.

In view of this, the present disclosure provides a modified cyanobacterium having improved protein secretory productivity, a modified cyanobacterium production method, and a protein production method using a modified cyanobacterium.

Solution to Problem

In the modified cyanobacterium according to an aspect of the present disclosure, a channel protein which improves protein permeability of an outer membrane is expressed.

Advantageous Effects

The modified cyanobacterium and the modified cyanobacterium production method are capable of providing a modified cyanobacterium having improved protein secretory productivity. Furthermore, the protein production method according to the present disclosure is capable of efficiently producing protein.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
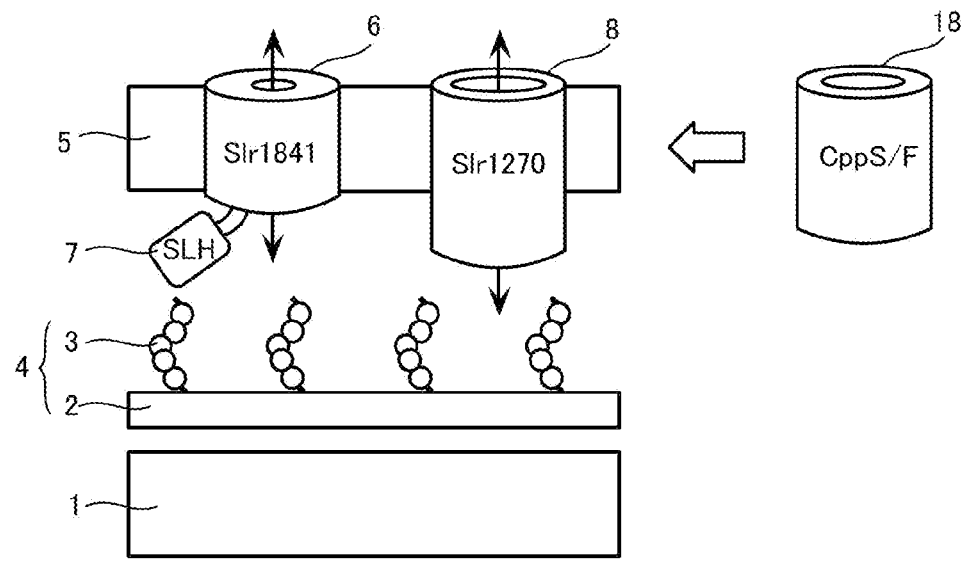
FIG. 1 is a diagram schematically illustrating a cell surface of a cyanobacterium.

DESCRIPTION OF EMBODIMENTS (Underlying Knowledge Forming Basis of Present Disclosure)

Cyanobacterium (also called blue-green bacterium or blue-green alga), a group of eubacterium, produces oxygen by splitting water through photosynthesis, and fixes $CO_2$ in air. Cyanobacterium can also fix nitrogen ($N_2$) in air, depending on its species. Rapid growth and high light use efficiency are known as characteristics of cyanobacterium. In addition, its genetic manipulation is easier than that of other eukaryotic alga species. Therefore, the utilization of cyanobacterium among the photosynthetic microbes is under active research and development. As mentioned above, the production of fuel such as ethanol (NPL 1), isobutanol (NPL 2), alkanes (PTL 1), and fatty acid (PTL 2) has been reported as examples of bio-manufacturing using cyanobacterium.

The production of materials serving as nutrient sources for organisms using cyanobacterium is also under research and development. For example, since protein can be synthesized only by living organisms, photosynthetic microbes which utilize light energy and $CO_2$ in the atmosphere are considered useful as an organism species for conveniently and efficiently producing protein.

For example, NPL 3 describes a protein production method using a cyanobacterium *Synechocystis* sp. PCC 6803 strain. The literature discloses the nucleotide sequence of a promoter for activating the gene transcription of an ethylene-forming enzyme with high efficiency, and a ribosomal binding sequence for enhancing translation.

NPL 4 discloses, in the case of expressing a recombinant protein with a *Synechocystis* sp. PCC 6803 strain as a host, an approach for inserting a gene encoding the protein to a NS-pCC2 region on a plasmid retained by this strain. Use of the approach has been reported to improve the expression efficiency of the recombinant protein by approximately 14 times as compared with the case of inserting the gene onto chromosomal DNA (deoxyribonucleic acid).

However, the conventional techniques mentioned above require disrupting the bacterial cell of the PCC6803 strain for retrieving protein produced within the bacterial cell of the PCC6803 strain. Hence, the production of the protein is time-consuming. Since various materials exist within the bacterial cell, it may be necessary to remove these materials and purify the protein of interest. Hence, the protein yield is decreased. It is also necessary to provide a fresh bacterial strain for each protein production, which is time-consuming and increases production cost. Thus, the conventional techniques mentioned above still have a low level of efficiency of protein production using cyanobacterium. There is a demand for the development of technology with higher production efficiency.

In view of this, the inventors have found that by causing a plant chloroplast-derived outer membrane channel protein to be expressed in the outer membrane of a cyanobacterium, protein permeability of the outer membrane improves. Accordingly, the inventors have found that the amount of protein produced by secretion per unit of culture solution or per cell of cyanobacterium increases.

Therefore, the present disclosure can provide a modified cyanobacterium having improved protein secretory productivity. Furthermore, by culturing the modified cyanobacterium according to the present disclosure, protein can be efficiently produced.

Outline of Present Disclosure

An outline of an aspect of the present disclosure is as described below.

A modified cyanobacterium according to an aspect of the present disclosure is a modified cyanobacterium in which a channel protein which improves protein permeability of an outer membrane is expressed.

This improves the protein permeability of the outer membrane. Thus, the modified cyanobacterium according to an aspect of the present disclosure can provide cyanobacterium having improved secretory productivity of protein.

For example, in the modified cyanobacteria according to an aspect of the present disclosure, the channel protein may be: CppS having an amino acid sequence represented by SEQ ID NO: 1; CppF having an amino acid sequence represented by SEQ ID NO: 2; or a protein having an amino acid sequence that is at least 50 percent identical to the amino acid sequence of either one the CppS and the CppF.

As a result, in the modified cyanobacterium, CppS (SEQ ID NO: 1) or CppF (SEQ ID NO: 2) serving as the channel protein which improves protein permeability of an outer membrane, or a protein functionally equivalent to any one of these channel proteins is expressed. Thus, the modified cyanobacterium according to an aspect of the present disclosure has improved protein permeability of the outer membrane.

For example, in the modified cyanobacteria according to an aspect of the present disclosure, a gene encoding the channel protein may have been introduced.

As a result, the channel protein which improves protein permeability of an outer membrane is expressed. Thus, the modified cyanobacterium according to an aspect of the present disclosure can provide cyanobacterium having improved secretory productivity of protein because the protein permeability of the outer membrane is improved.

For example, in the modified cyanobacteria according to an aspect of the present disclosure, the gene may be: cppS having a nucleotide sequence represented by SEQ ID NO: 3; cppF having a nucleotide sequence represented by SEQ ID NO: 4; or a gene having a nucleotide sequence that is at least 50 percent identical to the nucleotide sequence of either one of the cppS and the cppF.

As a result, in the modified cyanobacterium, the gene encoding the channel protein, represented by any one of SEQ ID NO: 3 and SEQ ID NO: 4 or a gene having a nucleotide sequence that is at least 50 percent identical to the nucleotide sequence of any one of these genes is introduced. Hence, in the modified cyanobacterium, the protein having the function of improving the protein permeability of the outer membrane or a protein functionally equivalent to the protein is expressed. Thus, the modified cyanobacterium according to an aspect of the present disclosure has improved protein permeability of the outer membrane.

A modified cyanobacterium production method according to an aspect of the present disclosure includes: causing expression of a channel protein which improves protein permeability of an outer membrane.

As a result, the channel protein which improves protein permeability of an outer membrane of cyanobacterium can be expressed. Hence, protein produced within the bacterial cell is easily secreted to the outside of the outer membrane (i.e., to the outside of the bacterial cell) by permeating the channel protein. Thus, the modified cyanobacterium production method according to an aspect of the present disclosure can produce a modified cyanobacterium having improved protein permeability of the outer membrane.

A protein production method according to an aspect of the present disclosure includes: culturing any of the above-described modified cyanobacterium.

As a result, protein produced within the bacterial cell (also referred to as a cell) of the modified cyanobacterium is secreted to the outside of the bacterial cell (i.e., into a culture solution), so that the protein secreted into the culture solution can be retrieved. This eliminates the need of collecting and disrupting the bacterial cell for protein retrieval. The bacterial cell can be repeatedly used even after protein retrieval. The modified cyanobacterium does not require special nutrition for its culture and can be conveniently cultured by the mere addition of light, water, air, and trace inorganic substances. Thus, the protein production method according to an aspect of the present disclosure can efficiently produce protein.

Hereinafter, embodiments will be described in detail with reference to the drawings.

It should be noted that each of the subsequently described embodiments shows a generic or specific example. Numerical values, materials, steps, the processing order of the steps indicated in the following embodiments are merely examples, and thus are not intended to limit the present disclosure. Furthermore, among the elements in the following embodiments, elements that are not described in the independent claims indicating the broadest concepts are described as optional elements.

Furthermore, the figures are not necessarily precise illustrations. In the figures, elements that are substantially the same are given the same reference signs, and overlapping description thereof may be omitted or simplified.

Moreover, in the following embodiments, numerical ranges include, not only the precise meanings, but also substantially equal ranges, such as, for example, a measured amount (for example, the number, the concentration, etc.) of a protein or a range thereof, etc.

In the present specification, both of a bacterial cell and a cell refer to one individual of cyanobacterium.

Embodiment

1. Definitions

In the present specification, the identity of a nucleotide sequence or an amino acid sequence is calculated with Basic Local Alignment Search Tool (BLAST) algorithm. Specifically, the identity is calculated by pairwise analysis with the BLAST program available in the website of the National Center for Biotechnology Information (NCBI). Information on cyanobacterium and plant genes and proteins encoded by these genes are published in, for example, the NCBI database mentioned above and Cyanobase. The amino acid sequence of the protein of interest and the nucleotide sequence of a gene encoding the protein can be obtained from these databases.

Cyanobacterium, also called blue-green alga or blue-green bacterium, is a group of prokaryote that collects light energy through chlorophyll and performs photosynthesis while generating oxygen through the splitting of water using the obtained energy. Cyanobacterium is highly diverse and includes, for example, unicellular species such as *Synechocystis* sp. PCC 6803 and filamentous species having multicellular filaments such as *Anabaena* sp. PCC 7120, in terms of cell shape. There are also thermophilic species such as *Thermosynechococcus elongatus*, marine species such as *Synechococcus elongatus*, and freshwater species such as *Synechocystis*, in terms of growth environment. Other examples thereof include many species having unique features, including species, such as *Microcystis aeruginosa*, which have a gas vesicle and produce toxin, and *Gloeobacter violaceus* which lacks thylakoid and has a light-harvesting antenna protein called phycobilisome in the plasma membrane.

FIG. 1 is a diagram schematically illustrating a cell surface of a cyanobacterium. As illustrated in FIG. 1, the cell surface of cyanobacterium is constituted by a plasma membrane (also referred to as inner membrane 1), peptidoglycan 2, and outer membrane 5 which is a lipid membrane that forms the outermost layer of the cell, in order from the inside. Sugar chain 3 constituted by glucosamine and mannosamine, etc. is covalently linked to peptidoglycan 2, and pyruvic acid is bound with this covalently linked sugar chain 3. In the present specification, peptidoglycan 2 and covalently linked sugar chain 3 are collectively referred to as cell wall 4. By binding sugar chain 3 of cell wall 4 and binding domain 7 of ion channel protein 6 to be described later, outer membrane 5 surrounds cell wall 4. The space between the plasma membrane (i.e., inner membrane 1) and outer membrane 5 is called periplasm where various enzymes involved in protein degradation or conformation formation, lipid or nucleic acid degradation, or uptake of extracellular nutrients, etc. are present.

Channel proteins refer to membrane proteins that form a pathway (i.e., a channel) for selectively allowing predetermined materials to permeate the lipid membrane (e.g., outer membrane 5) from the inside to the outside or from the outside to the inside. The outer membranes of general heterotrophic Gram-negative bacteria such as *E. coli* and salmonella are rich in a channel protein called Porin for selectively allowing relatively low-molecular-weight nutrients such as sugars and amino acids to permeate the outer membranes from the outside to the inside and taking them into the cells (NPL 5: Nikaido, 2003, Microbiol. Mol. Biol. Rev., 67 (4): 593-656). On the other hand, outer membrane 5 of cyanobacterium is free of Porin and is instead rich in ion channel protein 6 which permits selective permeation of only inorganic ions. Ion channel protein 6 accounts for approximately 80% of the total protein of the outer membrane 5 (NPL 6: Kowata et al., 2017, J. Bacteriol., 199(19): e00371-17). Hence, in cyanobacterium, high-molecular-weight materials such as protein have the difficulty in permeating outer membrane 5 and diffusing to the outside of the cell (i.e., the outside of outer membrane 5), unless the properties of outer membrane 5 are largely altered by use of a technique such as gene introduction.

Plant chloroplast originated from cyanobacterium which coexisted within primitive eukaryotic cells approximately 1.5 to 2 billion years ago and then evolved into chloroplast (NPL 7: Ponce-Toledo et al., 2017, Curr. Biol., 27 (3): 386-391). Chloroplast retained by glaucophytes, which are unicellular algae reported as the most primitive plants, has peptidoglycan and exhibits a surface structure very similar to that of cyanobacterium. On the other hand, the chloroplast of seed plants more evolutionally advanced from unicellular algae is free of peptidoglycan. Many outer membrane proteins of cyanobacterium were lost from the chloroplast outer membranes at the initial stage of emergence of chloroplast during the course of evolution. Hence, the chloroplast outer membrane proteins of the glaucophytes mentioned above differ largely in configuration in the outer membrane proteins of cyanobacterium. For example, outer membrane 5 of cyanobacterium is rich in ion channel protein 6, such as Slr1841, which permits permeation of inorganic substances. Ion channel protein 6 accounts for approximately 80% of the total protein of outer membrane 5. On the other hand, the chloroplast outer membranes of the glaucophytes are rich in channel proteins designated as CppS and CppF (hereinafter, also referred to as organic channel protein 18) which permit permeation of organic substances. This organic channel protein 18 accounts for 80% or more of the total protein of the chloroplast outer membrane of each glaucophyte (NPL 8: Kojima et al., 2016, J. Biol. Chem., 291: 20198-20209). CppS and CppF are channel proteins having a channel function for the selective permeation of relatively high-molecular-weight organic substances (e.g., biomolecules such as protein) and are considered to function as material transport pathways that connect the inside of the chloroplast in the plant cell to the cytoplasm of the plant cell. CppS and CppF are widely distributed in the glaucophytes. On the other hand, only bacteria belonging to the division Planctomycetes among bacterial have analogous proteins of CppS and CppF. Cyanobacterium retains none of CppS and CppF and their analogous proteins (see NPL 8).

In cyanobacterium, $CO_2$ fixed by photosynthesis is converted to various amino acids through multiple stages of enzymatic reaction. Protein is synthesized in the cytoplasm of cyanobacterium with these amino acids as starting materials. Such protein includes protein that functions in the cytoplasm and protein that is transported from the cytoplasm to the periplasm and functions in the periplasm. However, any case where protein is actively secreted to the outside of the cell has not been reported on cyanobacterium so far.

Cyanobacterium has high photosynthetic ability and therefore need not necessarily to take up organic substances as nutrients from the outside. Hence, cyanobacterium has only a very small amount of a channel protein, such as organic channel protein 8 (e.g., Slr1270) of FIG. 1, which permits permeation of organic substances, in outer membrane 5. For example, *Synechocystis* sp. PCC 6803 has only approximately 4% of organic channel protein 8 (for example, Slr1270) which permits permeation of organic substances based on the amount of total protein in outer membrane 5. On the other hand, outer membrane 5 of cyanobacterium is rich in an ion channel protein, such as ion channel protein 6 (e.g., Slr1841, etc.) of FIG. 1, which permits selective permeation of only inorganic ions, for high-efficiency cellular uptake of inorganic ions necessary for growth. For example, in *Synechocystis* sp. PCC 6803, ion channel protein 6 which permits permeation of inorganic ions accounts for approximately 80% of the total protein of outer membrane 5.

Thus, cyanobacterium is considered to have the difficulty in actively secreting protein produced within the bacterial cell to the outside of the bacterial cell, due to very few channels which permit permeation of organic substances such as protein in outer membrane 5.

2. Modified Cyanobacterium

Subsequently, the modified cyanobacterium according to the present embodiment will be described with reference to FIG. 1.

In the modified cyanobacterium according to the present embodiment, the channel protein (so-called organic channel protein 18) that improves the protein permeability of outer membrane 5 is expressed. Accordingly, since the protein permeability of outer membrane has improved, secretory productivity of protein that is produced within the bacterial cell and secreted to the outside of the bacterial cell improves. Furthermore, the modified cyanobacterium eliminates the need of retrieving protein by disrupting the bacterial cell and can therefore be repeatedly used in protein production even after protein retrieval. In the present specification, to make protein within the bacterial cell by the modified cyanobacterium is referred to as production, and to secrete the produced protein to the outside of the bacterial cell is referred to as secretory production.

The type of the cyanobacterium before improving the protein permeability of outer membrane 5 (hereinafter, referred to as a parent cyanobacterium), which serves as the parent microbe of the modified cyanobacterium according to the present embodiment, is not particularly limited and may be any type of cyanobacterium. The parent cyanobacterium may be, for example, the genus *Synechocystis, Synechococcus, Anabaena*, or *Thermosynechococcus*, and may be *Synechocystis* sp. PCC 6803, *Synechococcus* sp. PCC 7942, or *Thermosynechococcus elongatus* BP-1 among them.

It should be noted that, in the present Description, the phrase "cause expression of organic channel protein 18 in outer membrane 5 of cyanobacterium" means that a gene encoding organic channel protein 18 is inserted to chromosomal DNA or a plasmid of cyanobacterium, and organic channel protein 18 synthesized through transcription and translation of the gene is transported to outer membrane 5 and exerts a channel function of selectively allowing protein to permeate outer membrane 5 of cyanobacterium. Approaches for the insertion and expression of the gene are not particularly limited and are not limited by the nucleotide sequence of a promoter for transcriptional activation and a ribosomal binding sequence for translation as well as the type of a signal sequence for transport to outer membrane 5 as long as the approaches are usually used.

In the present embodiment, organic channel protein 18 to be expressed in outer membrane 5 of cyanobacterium may be a chloroplast-derived outer membrane channel protein. This organic channel protein 18 may be, for example, CppS (SEQ ID NO: 1) or CppF (SEQ ID NO: 2) of a glaucophyte *Cyanophora paradoxa* (hereinafter, also referred to as *C. paradoxa*). Alternatively, organic channel protein 18 may be a protein having an amino acid sequence that is at least 50 percent identical to the amino acid sequence of CppS or CppF. The protein having an amino acid sequence that is at least 50 percent identical to the amino acid sequence of CppS or CppF is not limited to a chloroplast-derived protein and may be, for example, a microbe (e.g., a bacterium)-derived analogous protein of CppS or CppF.

As a result, in the modified cyanobacterium, CppS (SEQ ID NO: 1) or CppF (SEQ ID NO: 2) serving as organic channel protein 18 which improves protein permeability of outer membrane 5, or a protein functionally equivalent to any one of these organic channel proteins 18 is expressed. Hence, in the modified cyanobacterium according to the present embodiment, the protein permeability of outer membrane 5 is improved.

In general, a protein having an amino acid sequence that is at least 30 percent identical to the amino acid sequence of a protein has high conformational homology to the protein and therefore, is reportedly likely to be functionally equivalent to the protein. Hence, organic channel protein 18 may be, for example, a protein or a polypeptide which has an amino acid sequence that has 40% or higher, preferably 50% or higher, more preferably 60% or higher, further preferably 70% or higher, still further preferably 80% or higher, even further preferably 90% or higher identity to the amino acid sequence of the protein represented by any one of SEQ ID NO: 1 and SEQ ID NO: 2, and which has a function of improving protein permeability of outer membrane 5.

In the present embodiment, in the modified cyanobacterium, a gene encoding organic channel protein 18 may have been introduced. Hence, in the modified cyanobacterium, organic channel protein 18 which improves protein permeability of outer membrane 5 is expressed.

The gene may be, for example, a chloroplast-derived gene. The chloroplast-derived gene encoding organic channel protein 18 may be, for example, cppS (SEQ ID NO: 3) or cppF (SEQ ID NO: 4) of a glaucophytes *Cyanophora paradoxa*. The gene of organic channel protein 18 may have a nucleotide sequence that is at least 50 percent identical to the nucleotide sequence of any one of these genes. As a result, in the modified cyanobacterium, the gene encoding organic channel protein 18, represented by any one of SEQ ID NO: 3 and SEQ ID NO: 4 or a gene having a nucleotide sequence that is 50 percent identical to the nucleotide sequence of any one of these genes is introduced. Hence, in the modified cyanobacterium, the protein having the function of improving the protein permeability of outer membrane 5 or a protein functionally equivalent to the protein is expressed. As a result, in the modified cyanobacterium, the protein permeability of outer membrane 5 is improved.

The gene encoding organic channel protein 18 is not limited to a chloroplast-derived gene. The gene encoding organic channel protein 18 may be, for example, a gene which has a nucleotide sequence that has 40% or higher, preferably 50% or higher, more preferably 60% or higher, further preferably 70% or higher, still further preferably 80% or higher, even further preferably 90% or higher identity to the nucleotide sequence of any of the genes cppS (SEQ ID NO: 3) and cppF (SEQ ID NO: 4), and which encodes a protein or a polypeptide having a function of improving the protein permeability of outer membrane 5.

3. Modified Cyanobacterium Production Method

Next, a modified cyanobacterium production method according to the present embodiment will be described. The modified cyanobacterium production method includes causing expression of organic channel protein 18 which improves the protein permeability of outer membrane 5.

In the present embodiment, organic channel protein 18 which improves protein permeability of outer membrane 5 is, for example, a chloroplast-derived channel protein and, specifically, may be CppS having the amino acid sequence represented by SEQ ID NO: 1 or CppF having the amino acid sequence represented by SEQ ID NO: 2. Alternatively, organic channel protein 18 may be a protein having an amino acid sequence that is at least 50 percent identical to the amino acid sequence of any one of these proteins.

In the expressing of organic channel protein 18, first, a gene encoding organic channel protein 18 which improves protein permeability of outer membrane 5 is inserted to chromosomal DNA or a plasmid of cyanobacterium. Then, organic channel protein 18 synthesized through transcription and translation of the gene is transported to outer membrane 5 and exerts a channel function in outer membrane 5 of cyanobacterium. Approaches for the insertion and expression of the gene are not particularly limited and are not limited by the nucleotide sequence of a promoter for transcriptional activation and a ribosomal binding sequence for translation as well as the type of a signal sequence for transport to outer membrane 5 as long as the approaches are usually used.

The modified cyanobacterium may be produced by causing expression of the channel protein which improves the protein permeability of outer membrane 5 according to the process described above.

As a result, in the modified cyanobacterium produced by the production method according to the present embodiment, organic channel protein 18 which improves protein permeability is expressed in outer membrane 5, so that the protein permeability of outer membrane 5 is improved. Hence, protein produced within the bacterial cell is easily secreted to the outside of outer membrane 5 (i.e., to the outside of the bacterial cell) by permeating this organic channel protein 18. Thus, the modified cyanobacterium production method according to the present embodiment can provide a modified cyanobacterium having improved secretory productivity of protein.

The modified cyanobacterium produced by the production method according to the present embodiment, as described above, eliminates the need of disrupting the bacterial cell for protein retrieval because protein produced within the bacterial cell easily diffuses to the outside of the bacterial cell. For example, the modified cyanobacterium can be cultured under appropriate conditions, and subsequently, protein secreted into the culture solution can be retrieved. Therefore, while the modified cyanobacterium is cultured, the protein in the culture solution may be retrieved. Hence, use of the modified cyanobacterium obtained by this production method enables efficient microbiological protein production to be carried out. Thus, the modified cyanobacterium production method according to the present embodiment can provide a modified cyanobacterium with high use efficiency that can be repeatedly used even after protein retrieval.

The modified cyanobacterium produced by the modified cyanobacterium production method according to the present embodiment secretes a protein group such as peptidase or phosphatase typically supposed to be present in the periplasm, to the outside of the cell. In the present embodiment, the modified cyanobacterium may be allowed to produce the desired protein, for example, by modifying a gene encoding a protein supposed to be produced within the cell of cyanobacterium, such as a protein group present in the periplasm, and replacing it with a gene encoding another protein. Thus, the modified cyanobacterium production method according to the present embodiment can also provide a modified cyanobacterium capable of conveniently and efficiently producing the desired protein.

4. Protein Production Method

Subsequently, the protein production method according to the present embodiment will be described. The protein production method according to the present embodiment comprises culturing the modified cyanobacterium described above.

Cyanobacterium culture can generally be carried out on the basis of liquid culture or a modified method thereof using a BG-11 medium (see Table 2). Hence, the culture of the modified cyanobacterium may be similarly carried out. The culture period of the cyanobacterium for protein production can be a period during which protein accumulates with a high concentration under conditions where the bacterial cell has proliferated sufficiently, and may be, for example, 1 to 3 days or may be 4 to 7 days. A culture method may be, for example, aeration and agitation culture or shake culture.

The modified cyanobacterium thus cultured under the conditions described above produces protein within the bacterial cell and secretes the protein into the culture solution. In the case of retrieving the protein secreted in the culture solution, insoluble materials such as the cell (i.e., the bacterial cell) may be removed from the culture solution by the filtration or centrifugation, etc. of the culture solution to retrieve a culture supernatant. The protein production method according to the present embodiment eliminates the need of disrupting the cell for protein retrieval because protein is secreted to the outside of the cell of the modified cyanobacterium. Hence, the modified cyanobacterium remaining after protein retrieval can be repeatedly used in protein production.

The method for retrieving the protein secreted into the culture solution is not limited to the example described above. While the modified cyanobacterium is cultured, the protein in the culture solution may be retrieved. For example, a protein-permeable membrane may be used to retrieve protein that has passed through the permeable membrane. In this case, a useful microbe such as lactic acid bacterium may be cultured by using, as a nutrient source, the protein that has passed through the permeable membrane.

Thus, treatment to remove the bacterial cell of the modified cyanobacterium from a culture solution is unnecessary because, while the modified cyanobacterium is cultured, protein in the culture solution can be retrieved. Hence, protein can be produced more conveniently and efficiently.

Damage and stress on the modified cyanobacterium can be reduced because bacterial cell retrieval treatment from a culture solution and bacterial cell disruption treatment are unnecessary. Hence, the secretory productivity of protein is less likely to be reduced in the modified cyanobacterium, and the modified cyanobacterium can be used for a longer time.

Thus, the protein production method using the modified cyanobacterium according to the present embodiment can conveniently and efficiently produce an enzyme for food ingredient starting material or compound production, a diagnostic or therapeutic enzyme in the medical field, or an enzyme for feed in the agricultural, fishery, and livestock fields.

WORKING EXAMPLE

Hereinafter, the modified cyanobacterium, the modified cyanobacterium production method, and the protein production method of the present disclosure will be specifically described with reference to working examples. However, the present disclosure is not limited by the following working examples by any means.

In the present working examples, a chloroplast outer membrane channel protein CppS (SEQ ID NO: 1) retained by a glaucophyte *Cyanophora paradoxa* was expressed in the outer membrane of cyanobacterium as a method for improving the protein permeability of the outer membrane of cyanobacterium. Then, the measurement of secretory productivity of protein and the identification of the secreted protein were performed as to the modified cyanobacterium caused to express the outer membrane channel protein CppS (SEQ ID NO: 1). The cyanobacterium species used in the present working examples is *Synechocystis* sp. PCC 6803 (hereinafter, simply referred to as "cyanobacterium").

(1) Construction of cppS Gene Expression Cassette

A gene cassette in which the cppS gene, a promoter region (PL22) for the expression control of the cppS gene, an outer membrane localization signal sequence (slr0042-signal) for cyanobacterium, and kanamycin resistance marker gene (KmR) serving as an indicator for gene introduction were linked was prepared by the following procedures.

First, the slr0042 gene was obtained by Polymerase chain reaction (PCR) amplification with the chromosomal DNA of cyanobacterium as a template using the primers slr0042-Fw (SEQ ID NO: 5) and slr0042-Rv (SEQ ID NO: 6) described in Table 1. Subsequently, PL22 and KmR were obtained by PCR amplification with the chromosomal DNA of a *Synechocystis* LY07 strain (NPL 9: Yao et al., ACS Synth. Biol., 2016, 5(3):207-212) as a template using a set of the primers slr2030-Fw (SEQ ID NO: 7) and PL22-Rv (SEQ ID NO: 8) and a set of the primers KmR-Fw (SEQ ID NO: 9) and slr2031-Rv (SEQ ID NO: 10) described in Table 1. Since the LY07 strain has these inserted in slr2030-slr2031 genes on the chromosomes, a form having the slr2030 gene fragment linked on the 5'-terminal side of PL22 and a form having the slr2031 gene fragment linked on the 3'-terminal side of KmR were amplified by PCR amplification using the four primers described above. Subsequently, a gene cassette (slr2030-2031::slr0042-KmR cassette) having the slr2030 gene fragment, PL22, the slr0042 gene, KmR, and the slr2031 gene fragment linked in order from the 5'-terminal side was obtained by PCR amplification with a mixed solution of the slr0042 gene, PL22, and KmR obtained by the procedures as a template using four primers (SEQ ID NOs: 7 to 10) described in Table 1. The slr2030-2031::slr0042-KmR cassette was inserted to a pUC19 plasmid by use of In-Fusion PCR Cloning® to obtain a pUC19-slr0042 plasmid.

In tandem with the procedures described above, total cDNA was prepared from a glaucophyte *C. paradoxa* NIES-547 using SMART cDNA Library Synthesis Kit (Clontech Laboratories, Inc.). The cppS gene was obtained by PCR amplification with this cDNA as a template using the primers cppS-Fw (SEQ ID NO: 11) and cppS-Rv (SEQ ID NO: 12) described in Table 1. The cppS gene was inserted to a pUC19-slr0042 plasmid by use of In-Fusion PCR Cloning® to obtain a pUC19-cppS plasmid. By this procedure, the cppS gene was inserted in a form linked on the 3'-terminal side of the outer membrane localization signal sequence of the slr0042 gene, and the region of the slr0042 gene except for the outer membrane localization signal sequence was removed by exchange with the coding region of cppS.

TABLE 1

| Primer name | Nucleotide sequence | SEQ ID NO |
|---|---|---|
| slr0042-Fw | 5'-TAGATATAATGTGTGGTAAATTAGAGGAATTCATCGCA-3' | 5 |
| slr0042-Rv | 5'-CGCTCTTCCGATCTGATTTAAAATGTGAACGTCGTCCGTAG-3' | 6 |
| slr2030-Fw | 5'-CAGTGAATTCGAGCTCGGTAATAACCGTTGTCCCTTTTGTTTCATCG-3' | 7 |
| PL22-Rv | 5'-TGTTAGTGAGCCCTGCTGTTAGCTCCCAGTATCTCTATCACTGAT 3' | 8 |
| KmR-Fw | 5'-ACAGCAGGGCTCACTAACAGTTTTAGAGCTAGAAATAGCAAGTTAAAATAA-3' | 9 |
| slr2031-Rv | 5'-GATTACGCCAAGCTTGCATGGGGAACAAGCTGAATCTGGGCATC-3' | 10 |
| CppS-Fw | 5'-TCCCTGGTTCCGCTGGGGCTATGGCCCCGGAGTGCACCGT-3' | 11 |
| CppS-Rv | 5'-ATTTGATGCCTGGCTCTAGTTTACAGAAGCTCGATCTCGA-3' | 12 |
| psbA1-Fw | 5'-CAGTGAATTCGAGCTCGGTATATAGCGTTGCAGTCCCTGG-3' | 13 |
| TetR-Rv | 5'-TAGCAGGTACTGCAAACGCTATGCCGCTCCCGGTGTTCGC-3' | 14 |

TABLE 1-continued

| Primer name | Nucleotide sequence | SEQ ID NO |
|---|---|---|
| TetR-Fw | 5'-TTAGAACTGGTAAACGATACTTACTGATCGATAACGAGCG-3' | 15 |
| psbA1-Rv | 5'-GATTACGCCAAGCTTGCATGACCGCGGTCACTTCATAACC-3' | 16 |

(2) Construction of Promoter Activity Control Cassette (tetR) of PL22

The promoter activity of the PL22 is induced only in the presence of anhydrotetracycline (aTc) by control mediated by TetR repressor. Thus, the tetR gene for PL22 activity control needs to be introduced to the modified cyanobacterium.

First, the tetR gene and spectinomycin resistance marker gene (SpcR) serving as an indicator for gene introduction were obtained by PCR amplification with the chromosomal DNA of the LY07 strain as a template using a set of the primers psbA1-Fw (SEQ ID NO: 13) and tetR-Rv (SEQ ID NO: 14) and a set of the primers tetR-Fw (SEQ ID NO: 15) and psbA1-Rv (SEQ ID NO: 16) described in Table 1. Since the LY07 strain has these inserted in psbA1 gene on the chromosomes, a form having the upstream fragment of the psbA1 gene linked on the 5'-terminal side of the tetR gene and a form having the downstream fragment of the psbA1 gene linked on the 3'-terminal side of SpcR were amplified by PCR amplification using the four primers described above. Subsequently, a gene cassette (psbA1::tetR cassette) having the psbA1 gene upstream fragment, TetR, SpcR, and the psbA1 gene downstream fragment linked in order from the 5'-terminal side was obtained by PCR amplification with a mixed solution of the tetR gene and SpcR as a template using the primers psbA1-Fw (SEQ ID NO: 13) and psbA1-Rv (SEQ ID NO: 14) described in Table 1. The psbA1::tetR cassette was inserted to a pUC19 plasmid by use of In-Fusion PCR Cloning® to obtain a pUC19-tetR plasmid.

(3) Insertion of cppS Gene Expression Cassette and tetR Cassette

1 μg of the pUC19-cppS plasmid obtained by the procedures described above and a cyanobacterium culture solution (bacterial cell concentration OD730=approximately 0.5) were mixed, and the plasmid was introduced into the cells by spontaneous transformation. The transformed cells were selected by growth on a BG-11 agar medium containing 30 μg/mL of kanamycin. In the selected cells, homologous recombination occurred between the slr2030-2031 genes on the chromosomes and the slr2030 and slr2031 gene fragment regions of psbA1 on the pUC19-cppS plasmid. In this way, a *Synechocystis* cppS strain having the insert of the cppS gene expression cassette in the slr2030-2031 gene region was obtained. The composition of the BG-11 medium used is as described in Table 2.

TABLE 2

| Component | Content (mg/L) |
|---|---|
| EDTA-Na | 1 |
| Ammonium Iron Citrate | 6 |
| NaNO3 | 1500 |
| MgSO4 | 75 |
| K2HPO4 | 39 |
| CaCl2 | 28.6 |
| H3BO4 | 2.8 |
| MnCl2 | 1.8 |
| ZnSO4 | 0.2 |

TABLE 2-continued

| Component | Content (mg/L) |
|---|---|
| CuSO4 | 0.08 |
| Na2MoO4 | 0.02 |
| Co(NO3)2 | 0.005 |
| TES-KOH (pH 7.5) | 4580 |

Subsequently, 1 μg of the pUC19-tetR plasmid and a *Synechocystis* cppS culture solution (bacterial cell concentration OD730=approximately 0.5) were mixed, and the plasmid was introduced into the cells by spontaneous transformation. The transformed cells were selected by growth on a BG-11 agar medium containing 30 μg/mL of kanamycin and 20 μg/mL spectinomycin to obtain a *Synechocystis* cppS tetR strain. As described above, this strain had the insert of the tetR cassette in the psbA1 gene on the chromosomal DNA.

(4) Test of Secretory Productivity of Protein

The *Synechocystis* cppS tetR strain obtained in the (3) was cultured under conditions described in each of Example 1 and Comparative Example 1 given below, and the amount of protein secreted to the outside of the cells (hereinafter, also referred to as the amount of secretory protein) was measured. The secretory productivity of protein was evaluated from the amount of protein in the culture solution. The secretory productivity of protein refers to the ability to produce protein by secreting intracellularly produced protein to the outside of the cells. Hereinafter, a specific method will be described.

(4-1) Culture of Modified Strain

Working Example 1

In Example 1, the *Synechocystis* cppS tetR strain was inoculated at initial bacterial cell concentration OD730=0.05 to a BG-11 medium containing 1 aTc and shake-cultured for 5 days under conditions of a light quantity of 100 μmol/m²/s and 30° C. The culture was performed three independent times.

Comparative Example 1

In Comparative Example 1, the *Synechocystis* cppS tetR strain was cultured under the same conditions as in Example 1 except that a BG-11 medium free of aTc was used. The culture was performed three independent times.

(4-2) Quantification of Secretory Produced Protein

The culture solution obtained in Example 1 in the (4-1) was centrifuged at 2,500 g at room temperature for 10 minutes to obtain a culture supernatant. The obtained culture supernatant was filtered through a membrane filter having a pore size of 0.22 μm to completely remove the cells of the *Synechocystis* cppS tetR strain. The amount of total protein contained in the culture supernatant thus filtered was quantified by the BCA (bicinchoninic acid) method. This series of operations was performed as to each of the three culture solutions obtained by culture performed three independent times to determine a mean and standard deviation of the amounts of protein secreted to the outside of the cells of the *Synechocystis* cppS tetR strain of Example 1. The amounts of protein in the three culture solutions were also quantified under the same conditions as above as to the *Synechocystis* cppS tetR strain cultured under the conditions of Comparative Example 1, and a mean and standard deviation of the amounts of protein in the three culture solutions was determined.

Figure 2:
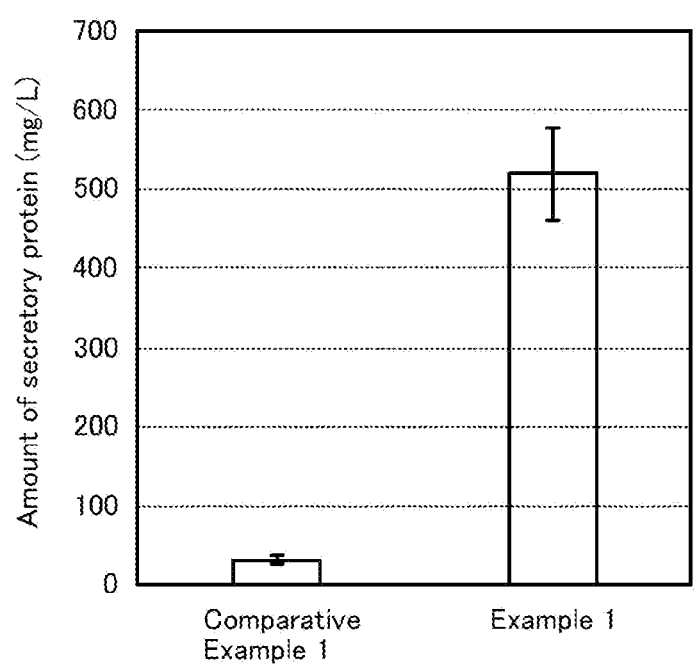
FIG. 2 is a graph illustrating the amount of protein (n=3, error bar=SD) in the culture supernatant of a modified cyanobacterium in Example 1 and Comparative Example 1.

The results are shown in FIG. 2. FIG. 2 is a graph illustrating the amount of protein (n=3, error bar=SD) in the culture supernatant of a modified cyanobacterium in Example 1 and Comparative Example 1.

As illustrated in FIG. 2, the amount (mg/L) of protein secreted into the culture supernatant was improved by approximately 25 times in the *Synechocystis* cppS tetR strain cultured in the presence of aTc in Example 1 compared with the *Synechocystis* cppS tetR cultured in the absence of aTc in Comparative Example 1.

Although the description of data is omitted, the absorbance (730 nm) of the culture solution was measured and the amount of secretory protein per g of bacterial cell dry weight (mg protein/g cell dry weight) was calculated. As a result, the amount of secretory protein per g of bacterial cell dry weight (mg protein/g cell dry weight) was improved by approximately 36 times in the *Synechocystis* cppS tetR strain cultured under the conditions of Example 1 compared with the *Synechocystis* cppS tetR strain cultured under the conditions of Comparative Example 1.

(5) Identification of Secreted Protein

Subsequently, the secreted protein contained in the culture supernatant obtained in the (4-2) was identified by LC-MS/MS. A method will be described below.

(5-1) Sample Preparation

Cold acetone was added in an amount of 8 times the fluid volume of the culture supernatant, and the mixture was left standing at 20° C. for 2 hours and then centrifuged at 20,000 g for 15 minutes to obtain a precipitate of the protein. To this precipitate, 100 mM Tris pH 8.5 and 0.5% sodium dodecanoate (SDoD) were added, and the protein was lysed with a closed sonicator. After adjustment of the protein concentration to 1 µg/mL, dithiothreitol (DTT) (final concentration: 10 mM) was added thereto, and the mixture was left standing at 50° C. for 30 minutes. Subsequently, iodoacetamide (IAA) (final concentration: 30 mM) was added thereto, and the mixture was left standing at room temperature (in the dark) for 30 minutes. In order to terminate the reaction of IAA, cysteine (final concentration: 60 mM) was added thereto, and the mixture was left standing at room temperature for 10 minutes. 400 ng of trypsin was added thereto, and the mixture was left standing overnight at 37° C. to convert the protein to peptide fragments. After addition of 5% TFA (trifluoroacetic acid), the mixture was centrifuged at 15,000 g at room temperature for 10 minutes to obtain a supernatant. By this operation, SDoD was removed. The sample was desalted using a C18 spin column and then dried with a centrifugal evaporator. Then, 3% acetonitrile and 0.1% formic acid were added thereto, and the sample was lysed using a closed sonicator. The peptide concentration was adjusted to 200 ng/µL.

(5-2) LC-MS/MS Analysis

The sample obtained in the (5-1) was analyzed using an LC-MS/MS apparatus (UltiMate 3000 RSLCnano LC System) under the following conditions:

Amount of sample injected: 200 ng
Column: CAPCELL CORE MP 75 µm×250 mm
Solvent: solvent A: 0.1% aqueous formic acid solution, solvent B: 0.1% formic acid+80% acetonitrile
Gradient program: 8% solvent B 4 minutes after sample injection, 44% solvent B 27 minutes later, 80% solvent B 28 minutes later, and completion of measurement 34 minutes later.

(5-3) Data Analysis

The obtained data was analyzed under the following conditions to perform protein and peptide identification and the calculation of quantification values.

Software: Scaffold DIA
Database: UniProtKB/Swiss Prot database (*Synechocystis* sp. PCC 6803)
Fragmentation: HCD
Precursor Tolerance: 8 ppm
Fragment Tolerance: 10 ppm
Data Acquisition Type: Overlapping DIA
Peptide Length: 8-70
Peptide Charge: 2-8
Max Missed Cleavages: 1
Fixed Modification: Carbamidomethylation
Peptide FDR: 1% or less Among the identified proteins, 10 types of proteins are described in Table 4 in the descending order of relative quantification values from the largest one.

TABLE 3

| | Protein name | Uniprot Accession ID | Gene name |
|---|---|---|---|
| 1 | Carboxy I-terminal protease | P73458 | prc |
| 2 | Sll0314 protein | Q55648 | sll0314 |
| 3 | Sll0470 protein | O55847 | sll0470 |
| 4 | Ssr1853 protein | P72639 | ssr1853 |
| 5 | Sll0319 protein | P74789 | sll0319 |
| 6 | Slr0581 protein | Q55408 | slr0581 |
| 7 | Carbon dioxide-concentrating mechanism | P72761 | ccmK2 |
| 8 | protein CcmK homolog 2 | Q55386 | slr0924 |
| 9 | Slr0924 protein | Q59991 | slr0042 |
| 10 | Slr0042 protein | P73817 | sll1951 |

All the 10 types of proteins were contained in each of the culture supernatants of Example 1 and Comparative Example 1. All of these proteins retained a periplasm (which refers to the space between the outer membrane and the inner membrane) localization signal. From these results, it was able to be confirmed that in the modified strain of Example 1, the protein permeability of the outer membrane is improved by the expression of the cppS gene so that protein in the periplasm is easily secreted to the outside of the outer membrane (i.e., to the outside of the bacterial cell) by permeating the channel protein CppS. Thus, the modified cyanobacterium according to the present embodiment was found to have drastically improved secretory productivity of protein.

(6) Discussion

In the present working examples, the modified cyanobacterium of the present disclosure was able to be confirmed to secrete protein present in the bacterial cell (here, in the periplasm) to the outside of the bacterial cell. Since protein secreted by the modified cyanobacterium was identified, a gene encoding the protein can be replaced with a gene encoding another protein by genetic modification. For example, the desired protein can be efficiently produced using the modified cyanobacterium by genetically modifying the modified cyanobacterium of the present disclosure so as to produce the desired protein instead of the protein identified above. Cyanobacterium, because of its high photosynthetic ability, can be cultured by the addition of light, water, air, and trace inorganic substances to conveniently obtain necessary protein when needed, and therefore eliminates the need of using a complicated apparatus for protein production. Protein easily loses its function, for example, when processed into supplements. Hence, the modified cyanobacterium of the present disclosure can provide protein with its function maintained. Because of these advantages, the modified cyanobacterium of the present disclosure is expected to be applied to various fields.

Although a modified cyanobacterium, a modified cyanobacterium production method, and a protein production method according to the present disclosure are described above based on the foregoing embodiments, the present discloser is not limited by the foregoing embodiments. Forms obtained by making various modifications to the foregoing embodiments that can be conceived by those skilled in the art as well as other forms realized by combining some of the components in the foregoing embodiments, for as long as they do not depart from the essence of the present disclosure, are included in the scope of the present disclosure.

INDUSTRIAL APPLICABILITY

The modified cyanobacterium, the modified cyanobacterium production method, and the protein production method using the modified cyanobacterium according to the present disclosure can efficiently produce protein by culturing the modified cyanobacterium by the addition of water, light, air, and trace inorganic substances. For example, an enzyme for food ingredient starting material or compound production, a diagnostic or therapeutic enzyme in the medical field, or an enzyme for feed in the agricultural, fishery, and livestock fields can be obtained.

The invention claimed is:

1. A modified cyanobacterium in which a channel protein is expressed, wherein the channel protein is:
   CppS having the amino acid sequence of SEQ ID NO: 1;
   CppF having the amino acid sequence of SEQ ID NO: 2; or
   a protein having an amino acid sequence that is at least 90 percent identical to the amino acid sequence of either one the CppS and the CppF.

2. A modified cyanobacterium in which a gene encoding a channel protein has been introduced, wherein the gene is:
   cppS having the nucleotide sequence of SEQ ID NO: 3;
   cppF having the nucleotide sequence of SEQ ID NO: 4; or
   a gene having a nucleotide sequence that is at least 90 percent identical to the nucleotide sequence of either one of the cppS and the cppF.

3. A modified cyanobacterium production method comprising:
   causing expression of a channel protein, wherein the channel protein is:
   CppS having the amino acid sequence of SEQ ID NO: 1;
   CppF having the amino acid sequence of SEQ ID NO: 2; or
   a protein having an amino acid sequence that is at least 90 percent identical to the amino acid sequence of either one the CppS and the CppF.

4. A protein production method comprising:
   culturing the modified cyanobacterium according to claim 1.

* * * * *

SEQUENCE LISTING

```
<160> NUMBER OF SEQ ID NOS: 16

<210> SEQ ID NO 1
<211> LENGTH: 335
<212> TYPE: PRT
<213> ORGANISM: Cyanophora paradoxa NIES-547

<400> SEQUENCE: 1

Met Ala Pro Glu Cys Thr Val Val Asn Ser Gly Ile Thr Ser Val Gly
1               5                   10                  15

Asp Val Arg Thr Ser Ala Thr Ala Gly Val Gln Thr Asn Ser Val Tyr
            20                  25                  30

Val Thr Ala Gln Leu Pro Gln Pro Val Val Glu Ala Gln Thr Phe Pro
        35                  40                  45

Val Pro Ile Thr Val Asn Lys Thr Val Ser Lys Thr Tyr Ala Ala Gln
    50                  55                  60

Asp Ile Pro Lys Asn Glu Lys Glu Ser Val Ser Thr Val Gln Ile Pro
65                  70                  75                  80

Val Lys Glu Tyr Thr Lys Ile His Tyr Asp Tyr Glu Leu Pro Glu Asn
                85                  90                  95

Asn Val Glu Thr Val Asp Glu Val Lys Asp Ile Ile Val Ser Asp Phe
            100                 105                 110

Ile Ser Glu Thr Tyr Glu Phe Asp Phe Pro Glu Asp Thr Ile Lys Glu
        115                 120                 125

Glu Lys Val Ser Ile Pro Val Tyr Glu Glu Val Val Thr Thr Lys Thr
    130                 135                 140

Tyr Lys Val Asn Leu Pro Gln Asp Ser Glu Thr Arg Val Glu Asn Thr
145                 150                 155                 160

Phe Thr Val Pro Ala Thr Lys Tyr Thr Thr Thr Tyr Asp Tyr Cys
                165                 170                 175

Gly Gln Ile Pro Glu Cys Lys Thr Asp Tyr Lys Glu Tyr Thr Gln Lys
            180                 185                 190

Leu Asp Val Thr Lys Thr Glu Glu Thr Lys Tyr Lys Tyr Glu Val Pro
        195                 200                 205

Leu Lys Asp Lys Ala Leu Cys Pro Glu Asp Leu Thr Val Glu Gly Lys
    210                 215                 220

Ile Lys Thr Ala Lys Val Val Asn Tyr Asp Leu Pro Ala Asp Ser Val
225                 230                 235                 240

Lys Glu Glu Thr Ser Glu Glu Thr Ile Asn Gln Thr Val Val Tyr Ala
```

```
                       245                 250                 255
Thr Asp Phe Lys Pro Leu Pro Cys Asn Ser Gly Asn Cys Pro Ala Lys
                260                 265                 270
Gly Ala Val Pro Ser Val Tyr Asp Phe Gly Ser Asn Pro Ile Leu Asn
            275                 280                 285
Pro Gln Leu Asp Ala Glu Thr Gln Ala Val Asp Leu Gln Ala Asp Tyr
        290                 295                 300
Met Asp Met Ile Ile Gly Ala Ser Ser Glu Ala Val Asp Ser Asp Ile
305                 310                 315                 320
Leu Ile Asp Ser Gln Ser Glu Glu Ala Val Glu Ile Glu Leu Leu
                325                 330                 335

<210> SEQ ID NO 2
<211> LENGTH: 375
<212> TYPE: PRT
<213> ORGANISM: Cyanophora paradoxa NIES-547

<400> SEQUENCE: 2

Met Ser Arg Pro Glu Asn Val Ala Ser Leu Pro Ile Gly Glu Gly Ala
1               5                   10                  15
Ala Pro Ala His Pro Ile Pro Ser Ile Pro Ala Ala Glu Cys Lys Pro
                20                  25                  30
Ala Ala Arg Ile Glu Pro Glu Thr Ser Gln Lys Tyr Gly Thr Leu Tyr
            35                  40                  45
Thr Thr Gln Val Pro Tyr Ile Gln Thr Thr Glu Tyr Glu Glu Tyr
        50                  55                  60
Asp Ile Pro Glu Asp Ser Val Ile Val Glu Thr Arg Pro Ile Lys Val
65                  70                  75                  80
Pro Phe Ser Glu Thr Thr Thr Lys Thr Trp Glu Val Glu Leu Pro Pro
                85                  90                  95
Ala Gly Gln Glu Val Ser Tyr Gly Thr Leu Ala Leu Pro Val Glu Lys
            100                 105                 110
Val Val His Thr Ser Tyr Asp Tyr Gln Leu Pro Ala Lys Gln Ala Thr
        115                 120                 125
Thr Glu Pro Ser Pro Ala Glu Ile Thr Ala Lys Lys Ile Thr Ser Ile
    130                 135                 140
Asp Tyr Asp Tyr Glu Leu Pro Glu Asn Lys Ala Val Tyr Thr Thr Lys
145                 150                 155                 160
Val Tyr Met Ile Pro Ile Glu Glu Thr Ile Val Gln Thr Lys Thr Tyr
                165                 170                 175
Ser Ala Lys Leu Pro Ser Asp Tyr Glu Ala Glu Lys Thr Asp Val
            180                 185                 190
Glu Ile Ala Gly Arg Lys Leu Thr Thr His Thr Tyr Glu Tyr Lys Val
        195                 200                 205
Pro Ser Cys Asp Thr Lys Val Tyr Ser Asp Leu Val Asp Val Asn Val
    210                 215                 220
Lys Gln Ser Val Thr Lys Ser Tyr Ala Tyr Lys Leu Pro Asp Cys Glu
225                 230                 235                 240
Lys Pro Val Glu Thr Lys Phe Ala Thr Ala Asp Gly Val Glu Thr Ile
                245                 250                 255
Thr Leu Thr Lys Asp Tyr Leu Leu Pro Cys Glu Asn Thr Thr Thr Lys
            260                 265                 270
Leu Asn Pro Thr Glu Ala Ser Val Lys Ala Ala Ala Ser Ser Ala Ala
        275                 280                 285
```

```
Thr Cys Asn Asn Cys Gly Ser Ser Pro Ser Val Asn Glu Val Arg Tyr
    290                 295                 300

Gln Tyr Asp Pro Ala Lys Val Thr Val Thr Lys Gln Leu Glu Glu Ser
305                 310                 315                 320

Met Gln Gln Ala Glu Asp Ala Ile Ala Gly Glu Leu Ala Asn Met
            325                 330                 335

Ser Ser Asp Ala Glu Ser Met Pro Leu Ala Glu Ser Ser Asp Val Ala
                340                 345                 350

Asn Val Glu Ile Ser Glu Glu His Cys Glu Leu Ile Ser Glu Leu Asp
            355                 360                 365

Asn Ile Asp Ala Glu Leu Leu
    370                 375
```

<210> SEQ ID NO 3
<211> LENGTH: 1008
<212> TYPE: DNA
<213> ORGANISM: Cyanophora paradoxa NIES-547

<400> SEQUENCE: 3

```
atggccccgg agtgcaccgt cgtgaactct ggcatcacca gcgttggtga tgtccgcacc    60
tctgccaccg ctggcgtgca gaccaactcc gtctacgtga cggcccagct gccccagccg   120
gtcgttgagg cgcagacctt cccggtcccg atcaccgtca acaagacggt gtcgaagacc   180
tatgcggccc aggacatccc gaagaacgag aaggagtccg tgtcgactgt ccagatcccg   240
gtgaaggagt acaccaagat ccactacgac tatgagctcc ggagaacaa cgtcgagacc    300
gtcgatgagt gaaggacat catcgtgtcc gacttcatct ccgagaccta cgagttcgac   360
ttcccggagg acaccatcaa ggaggagaag gtgtcgatcc cggtgtacga ggaggtcgtg   420
accaccaaga cctacaaggt caacctgccc aggacagcg agacccgcgt cgagaacact    480
ttcaccgtgc cggcgaccaa gtacaccacc accacctacg actactgcgg tcagatcccg   540
gagtgcaaga ctgactacaa ggagtacacc cagaagctcg acgtgacgaa gaccgaggag   600
accaagtaca gtacgaggt gccgctcaag acaaggcgc tctgcccgga ggacctcacc    660
gtcgagggca agatcaagac cgctaaggtc gtgaactacg atctgcccgc ggactccgtg   720
aaggaggaga ccagcgagga gaccattaac cagactgtcg tgtacgcgac tgacttcaag   780
cccctgccct gcaactctgg caactgcccg gcgaagggtg cggtgccgtc ggtgtacgac   840
tcggctcga accccatcct gaaccccag ctcgacgcgg agacgcaggc ggttgacctc    900
caggcggatt acatggacat gatcatcggc gctagctctg aggcggtgga ctctgacatc   960
ctcatcgaca gccaaagcga ggaggcggtc gagatcgagc ttctgtaa              1008
```

<210> SEQ ID NO 4
<211> LENGTH: 1128
<212> TYPE: DNA
<213> ORGANISM: Cyanophora paradoxa NIES-547

<400> SEQUENCE: 4

```
atgtcgcgcc ccgagaacgt tgcgagcctg ccgatcggcg agggcgctgc cccggcgcac    60
ccgattccca gcatcccggc ggctgagtgc aagcccgcgg ctcgcattga gcccgagacc   120
tcgcagaagt atggcactct ctacaccacc caggtgccgt acatccagac taccactgag   180
tacgaggagt acgacatccc ggaggactcg gtgatcgtcg agacccgccc gattaaggtc   240
ccgttctcgg agaccaccac gaagacctgg gaggtcgagc tcccgcccgc gggcaggag    300
gtttcgtacg gcactctcgc cctgccggtt gagaaggtcg tgcacacctc gtacgactac   360
```

```
cagctgccgg cgaagcaggc gaccaccgag ccgtccccgg ctgagatcac ggcgaagaag    420
atcacctcga tcgactacga ctatgagctt cctgagaaca aggcggttta caccacgaag    480
gtgtacatga tccccattga ggagaccatc gtccagacca agacctactc ggctaagctc    540
ccgtcggact acgaggcgga ggagaagact gatgttgaga tcgccggccg gaagctgacc    600
acgcacacct acgagtacaa ggtcccgagc tgcgacacca aggtttacag cgacctcgtc    660
gacgtgaacg tgaagcagtc cgtgaccaag tcgtacgcct acaagcttcc ggactgcgag    720
aagcctgttg agactaagtt cgcgaccgcg gacggtgttg agaccattac tctcaccaag    780
gactacctcc tgccctgcga gaacaccacc accaagctca cccgactga ggcgtcggtc    840 aaggcggctg cgtcgtcggc ggcgacctgc aacaactgcg gctctagccc ctcggtcaac    900
gaggtccgct accagtatga cccggccaag gtcactgtga ccaagcagct ggaggagtcg    960
atgcagcagg cggaggatga tgcgattgcg ggcgagctgg cgaacatgtc gtctgatgcg   1020
gagtcgatgc ccctggcgga gtcgagcgat gtcgcgaacg ttgagatcag cgaggagcac   1080
tgcgagctca ttagcgaact cgacaacatt gatgccgagc tgctgtaa               1128
```

<210> SEQ ID NO 5
<211> LENGTH: 38
<212> TYPE: DNA
<213> ORGANISM: Artificial Sequence
<220> FEATURE:
<223> OTHER INFORMATION: Synthesized Primer

<400> SEQUENCE: 5

```
tagatataat gtgtggtaaa ttagaggaat tcatcgca                              38
```

<210> SEQ ID NO 6
<211> LENGTH: 40
<212> TYPE: DNA
<213> ORGANISM: Artificial Sequence
<220> FEATURE:
<223> OTHER INFORMATION: Synthesized Primer

<400> SEQUENCE: 6

```
cgctcttccg atctgattta aaatgtgaac gtcgtccgta                            40
```

<210> SEQ ID NO 7
<211> LENGTH: 47
<212> TYPE: DNA
<213> ORGANISM: Artificial Sequence
<220> FEATURE:
<223> OTHER INFORMATION: Synthesized Primer

<400> SEQUENCE: 7

```
cagtgaattc gagctcggta ataaccgttg tccttttgt ttcatcg                     47
```

<210> SEQ ID NO 8
<211> LENGTH: 45
<212> TYPE: DNA
<213> ORGANISM: Artificial Sequence
<220> FEATURE:
<223> OTHER INFORMATION: Synthesized Primer

<400> SEQUENCE: 8

```
tgttagtgag ccctgctgtt agctcccagt atctctatca ctgat                      45
```

<210> SEQ ID NO 9
<211> LENGTH: 51
<212> TYPE: DNA

```
<213> ORGANISM: Artificial Sequence
<220> FEATURE:
<223> OTHER INFORMATION: Synthesized Primer

<400> SEQUENCE: 9
acagcagggc tcactaacag ttttagagct agaaatagca agttaaaata a           51

<210> SEQ ID NO 10
<211> LENGTH: 44
<212> TYPE: DNA
<213> ORGANISM: Artificial Sequence
<220> FEATURE:
<223> OTHER INFORMATION: Synthesized Primer

<400> SEQUENCE: 10
gattacgcca agcttgcatg gggaacaagc tgaatctggg catc                  44

<210> SEQ ID NO 11
<211> LENGTH: 40
<212> TYPE: DNA
<213> ORGANISM: Artificial Sequence
<220> FEATURE:
<223> OTHER INFORMATION: Synthesized Primer

<400> SEQUENCE: 11
tccctggttc cgctggggct atggccccgg agtgcaccgt                       40

<210> SEQ ID NO 12
<211> LENGTH: 40
<212> TYPE: DNA
<213> ORGANISM: Artificial Sequence
<220> FEATURE:
<223> OTHER INFORMATION: Synthesized Primer

<400> SEQUENCE: 12
atttgatgcc tggctctagt ttacagaagc tcgatctcga                       40

<210> SEQ ID NO 13
<211> LENGTH: 40
<212> TYPE: DNA
<213> ORGANISM: Artificial Sequence
<220> FEATURE:
<223> OTHER INFORMATION: Synthesized Primer

<400> SEQUENCE: 13
cagtgaattc gagctcggta tatagcgttg cagtccctgg                       40

<210> SEQ ID NO 14
<211> LENGTH: 40
<212> TYPE: DNA
<213> ORGANISM: Artificial Sequence
<220> FEATURE:
<223> OTHER INFORMATION: Synthesized Primer

<400> SEQUENCE: 14
tagcaggtac tgcaaacgct atgccgctcc cggtgttcgc                       40

<210> SEQ ID NO 15
<211> LENGTH: 40
<212> TYPE: DNA
<213> ORGANISM: Artificial Sequence
<220> FEATURE:
<223> OTHER INFORMATION: Synthesized Primer

<400> SEQUENCE: 15
ttagaactgg taaacgatac ttactgatcg ataacgagcg                       40
```

```
<210> SEQ ID NO 16
<211> LENGTH: 40
<212> TYPE: DNA
<213> ORGANISM: Artificial Sequence
<220> FEATURE:
<223> OTHER INFORMATION: Synthesized Primer

<400> SEQUENCE: 16
gattacgcca agcttgcatg accgcggtca cttcataacc                40
```